United States Patent [19]

Knifton

[11] 4,038,208

[45] July 26, 1977

[54] PROCESSES FOR REGENERATING DISPERSIONS OF LIGAND-STABILIZED, PALLADIUM(II) HALIDE COMPLEXES USED IN CARBONYLATION CATALYSTS

[75] Inventor: John F. Knifton, Poughquag, N.Y.

[73] Assignee: Texaco Inc., New York, N.Y.

[21] Appl. No.: 635,994

[22] Filed: Nov. 28, 1975

[51] Int. Cl.² .................. B01J 31/40; B01J 27/32; C07C 51/00; C11C 3/02
[52] U.S. Cl. .................. 252/412; 252/414; 260/410.9 R; 260/429 R; 260/429.7; 260/468 M; 260/497 R; 260/514 M; 260/515 R; 260/533 A
[58] Field of Search .................. 252/412, 414, 429 R; 260/410.9 R, 413, 533 A

[56] References Cited

U.S. PATENT DOCUMENTS

| | | | |
|---|---|---|---|
| 3,420,873 | 1/1969 | Olivier | 252/415 |
| 3,455,989 | 7/1969 | Ktepow et al. | 260/514 M |
| 3,641,076 | 2/1972 | Booth | 260/429 R |
| 3,700,706 | 10/1972 | Butter | 260/410.9 R |
| 3,832,391 | 8/1974 | Parshall | 260/413 |
| 3,968,133 | 7/1976 | Knifton | 260/410.9 R |

*Primary Examiner*—Winston A. Douglas
*Assistant Examiner*—P. E. Konopka
*Attorney, Agent, or Firm*—Thomas H. Whaley; Carl G. Ries; Bernard Marlowe

[57] ABSTRACT

This invention concerns processes for regeneration of carbonylation catalysts consisting of dispersions of ligand-stabilized palladium(II) halide complexes in quaternary ammonium, phosphonium and arsonium salts of trihalostannate(II) and trihalogermanate(II) using hydrogen peroxide as the regenerating agent.

3 Claims, No Drawings

PROCESSES FOR REGENERATING DISPERSIONS OF LIGAND-STABILIZED, PALLADIUM(II) HALIDE COMPLEXES USED IN CARBONYLATION CATALYSTS

STATEMENT OF THE INVENTION

This invention pertains to the art of regenerating spent palladium carbonylation catalysts useful for the carbonylation of olefins.

More particularly, this invention concerns the regeneration of certain carbonylation catalysts consisting of dispersions of ligand-stabilized palladium(II) halide complexes in quaternary ammonium, phosphonium and arsonium salts of trihalostannate(II) and trihalogermanate(II) using aqueous solutions of hydrogen peroxide as the regenerating agent.

BACKGROUND OF THE INVENTION

This invention concerns a process for regenerating certain palladium catalysts used in the carbonylation of olefins. Carbonylation refers here to the reaction of α-olefins with carbon monoxide and active-hydrogen-containing compounds selected from the group consisting of alkanols or water. The major products of carbonylation are fatty (carboxylic) acids and their esters.

The preparation of the fatty acids or fatty acid esters using metal carbonyls or carbonyl precursors to catalyze the carbonylation of olefins is old in the literature, originally involving Reppe and his coworkers and contemporaries. Reviews of C. W. Bird [Chem. Rev. 62, (1962)] document this work. Unfortunately, many of these carbonyl or carbonyl-type catalysts have the disadvantages of inherent toxicity, they require stringent reaction conditions which in turn lead to competing side reactions such as olefin isomerization, polymerization and reduction, and they exhibit poor selectivity to the desired linear acid ester.

Recently, more acceptable homogeneous catalyst systems have been developed which offer substantially improved selectivity in converting olefins to primarily linear fatty acids or linear fatty esters, in good yield, under moderate reaction conditions of temperature and pressure.

As is usually the case, after much more extensive usage, certain drawbacks in the catalysts have become more evident. These include difficulty in maintaining high conversions, high selectivities and high yields after recycling the catalyst several times. These problems are due to catalyst degradation as well as catalyst decomposition, mechanical losses and further catalyst decomposition during the separation of the products from the homogeneous catalysts and the inert solvents of the reaction mixture. Thermal instability of the catalyst is particularly troublesome in the recovery and working-up of certain ligand-stabilized homogeneous palladium catalyst reaction mixtures.

In order to avoid or minimize these problems, the use of molten quaternary ammonium, phosphonium and arsonium salts of trihalostannate(II) and trihalogermanate(II) as both solvent and part of the catalytic entity has been disclosed, particularly in the two United States patents of G. W. Parshall, U.S. Pat. Nos. 3,657,368 and 3,565,823, which are known art as well as in applicant's Serial No. 526,867 filed 11/25/74 in the United States Patent Office. More recently, two procedures involving distillation and solvent extraction as a means of isolating fatty acid/ester products from palladium carbonylation catalysts consisting of dispersions of ligand-stabilized palladium(II) halides in quaternary ammonium, phosphonium and arsonium salts of trihalostannate(II) and trihalogermanate(II) have been set forth in Ser. No. 581,320 and Ser. No. 581,395 both filed May 27, 1975. Following the separation of catalyst and fatty acid ester product by these methods the palladium catalyst is suitable for recycle with fresh olefin/alcohol feed. Regeneration of the same palladium catalysts after multiple cycling by chlorination or mineral acid treatment is also set forth in applications Ser. No. 581,320 and 581,395. Each of these process improvements allows the development of an efficient carbonylation process having the advantages of:

1. a simple and efficient means of separating catalyst from the products,
2. the ability to recycle the catalyst without its substantial deactivation. This is particularly important since the palladium catalysts are thermally sensitive, and
3. a capability for operating at high catalyst concentrations in the feed stream, thereby minimizing capital costs.

DESCRIPTION OF THE INVENTION

The critical aspect of this application is the claimed process for restoring the activity of the above mentioned spent catalyst dispersions of ligand-stabilized palladium(II) halide salts in quaternary ammonium, phosphonium and arsonium salts of trihalostannate(II) and trihalogermanate(II) by treatment with hydrogen peroxide reagent.

The spent carbonylation catalyst may be regenerated by the procedure of:

1. Contacting said spent catalyst with an aqueous solution of hydrogen peroxide;
2. Adding additional stabilizing ligand, such as triphenylphosphine, and
3. Recharging the treated palladium catalyst to the carbonylation reactor with fresh olefin-alcohol feed.

This procedure is exemplified by Example 1, described infra.

An alternative, and more specific procedure is as follows:

1. The spent catalyst is contacted with an aqueous solution of hydrogen peroxide.
2. Excess liquid is removed by distillation.
3. Additional stabilizing ligand, such as triphenylphosphine, is added in the mole ratio of 1-10 mole of ligand per gram atom of Pd.

Generally speaking, hydrogen peroxide is added to the spent palladium carbonylation catalyst as an aqueous solution. The concentration of $H_2O_2$ present in the aqueous media may vary from 1 to 90% (V/V), but at least one mole of peroxide should be added per gram atom of palladium present in the spent catalyst. Preferably, an excess of hydrogen peroxide should be employed, from 1 to $10^4$ moles of peroxide reagent per gram atom of palladium. Likewise, the time and temperature of regeneration are not critical, and temperatures of 20° to 150° may be employed for 0.01 to 48 hours, according to the choice of palladium catalyst to be regenerated, and the concentration of peroxide reagent. Regeneration is judged to have occurred when a sample of treated catalyst delivers a selectivity to the desired linear fatty (carboxylic) acid or ester of between 70 and 95% and a yield of total ester from 20 to 95 mole %.

Regeneration of palladium carbonylation catalysts with hydrogen peroxide reagent is exemplified infra in Example 1 for the melt complex [(C₂H₅)₄N][SnCl₃]-PdCl₂[P(C₆H₅)₃]₂. Other palladium carbonylation catalysts beyond [(C₂H₅)₄N][SnCl₃]-PdCl₂[P(C₆H₅)₃]₂ may also be regenerated by this technique. These catalysts generally consist of ligand-stabilized palladium(II) halide complexes dispersed in quternary ammonium, phosphonium and arsonium salts of trihalostannate(II) and trihalogermanate(II). They are illustrated, but not limited by, the carbonylation catalysts described in Examples 3 to 9.

Other substrate mixtures beyond the 1-octene, ethanol used in Example 1 may also be carbonylated by the regenerate palladium carbonylation catalysts. Some typical examples are given in Examples 10-15, described infra. Generally, for the carbonylation of α-olefins, as exemplified in equation 1, $R_1$ and $R_2$, individually, may be hydrogen, alkyl up to 12 carbon atoms, alkenyl up to 12 carbon atoms, or aryl up to 12 carbon atoms, or mineral alkylaryl or arylalkyl groups. Suitable alkanols (ROH)

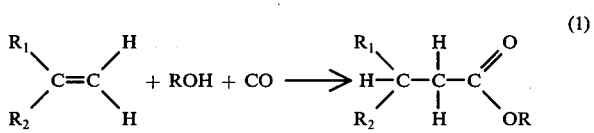

(1)

include primary and secondary alcohols of 1 to 12 carbon atoms, phenols, substituted alcohols and polyols.

The major products of the carbonylation reaction are fatty (carboxylic) acids and their esters.

the solid catalyst by filtration. Unreacted octenes and ethanol are removed from the liquid product by distillation under reduced pressure (5 cm Hg) and the residual liquid subjected to further distillation. Ethyl nononoate products are recovered in up to 81 mole % yield (99% purity) as distillate fraction having a boiling point of 58°-62° C at 2 mm Hg pressure. The residual palladium chloride catalyst, [(C₂H₅)₄N][SnCl₃]-PdCl₂[P(C₆H₅)₃]₂, is recharged to the reactor with additional fresh 1-octene (0.5 mole) and ethanol (0.5 mole) and the carbonylation reaction is repeated as described above. Ethyl nononoates are recovered by distillation.

After the third cycle, the melt is treated with 10 ml of aqueous hydrogen peroxide solution (30% v/v concentration) and triphenylphosphonine (4.19 g., 16 mm) at 22° C and the reaction mixture recharged to the reactor with equi-molar amounts of 1-octene and ethanol (0.5 mole each). Carbonylation and ethyl nononoate isolation recovery are as described above. Hydrogen peroxide treatment is repeated after the 7th cycle. The total yield of ethyl nonanoate after 10 cycles is 220 moles per gm atom of palladium charged, with the maximum yield certainly exceeding this figure.

Table I establishes the effectiveness of hydrogen peroxide treatment as a means of regenerating palladium carbonylation catalysts such as 10[(C₂H₅)₄N][SnCl₃]-PdCl₂[P(C₆H₅)₃]₂. While the yield data for cycles I - III is generally higher than for cycles IV - VII, the selectivity to desired linear ester is actually higher for the $H_2O_2$ treated catalyst. After a second regeneration with peroxide this selectivity remains above 90%.

TABLE I

PREPARATION OF ETHYL NONANOATE WITH RECOVERY OF ESTER BY DISTILLATION AND REGENERATION OF PALLADIUM CATALYST BY THE ADDITION OF HYDROGEN PEROXIDE REAGENT

| CYCLE | PROCEDURE | ETHYL C₉ ESTER LINEARITY(%)[a] | ETHYL C₉ ESTER YIELD(MOLE %)[b] | LIQUID YIELD(%) | ISOLATED ESTER PURITY(%)[a] |
|---|---|---|---|---|---|
| I | Fresh Catalyst | 79.9 | 97 | 94 | 99 |
| II | Recycle | 83.1 | 88 | 100 | 99 |
| III | Recycle | 83.2 | 29 | 98 | 99 |
| IV | Add H₂O₂+PPl₃ | 92.3 | 25 | 100 | 99 |
| V | Recycle | 91.9 | 62 | 96 | 95 |
| VI | Recycle | 91.6 | 11 | 101 | 79 |
| VII | Recycle | 91.5 | 1.3 | 97 | 78 |
| VIII | Add H₂O₂+PPh₃ | 93.2 | 1.3 | 108 | 74 |
| IX | Recycle | 92.2 | 9.7 | 100 | 77 |
| X | Recycle | 91.5 | 6.5 | 103 | 98 |

[a]Estimated by GLPC analysis of isolated (distilled) product
[b]Estimated by GLPC analysis of crude liquid product, based on 1-octene charged.

EXAMPLE 1

PREPARATION OF ETHYL NONANOATE WITH RECOVERY OF ESTER BY DISTILLATION AND REGENERATION OF PALLADIUM CATALYST VIA TREATMENT WITH HYDROGEN PEROXIDE

To a degassed sample of 1-octene (0.5 mole) and ethanol (0.5 mole) contained in a glass lined reactor equipped for pressurizing, heating, cooling and means of agitation, is added the following reactants under a nitrogen purge, tetraethylammonium trichlorostannate(II) (8.0 mmole) and bis(triphenylphenylphoshine) palladium(II) chloride (8.0 mmole). The mixture is purged with carbon monoxide and heated to 80° C under 1500 psig of carbon monoxide. The carbonylation reaction is terminated after 6-8 hours by cooling and venting, and the liquid product (108 ml) recovered from

EXAMPLE 2

PREPARATION OF ETHYL NONANOATE WITH RECOVERY OF ESTER BY DISTILLATION AND REGENERATION OF PALLADIUM CATALYST WITH HYDROGEN PEROXIDE BUT NO TRIPHENYLPHOSHINE

To an appropriately sized reactor fitted as in Example 1 is added the octene-1 charge, ethanol and the components of the palladium melt catalyst [(C₂H₅)₄N][SnCl₃]-PdCl₂[P(C₆H₅)₃]₂. The charge is purged with nitrogen to deoxygenate, pressurized to 1500 psig with carbon monoxide, and agitated while heating between 80° and 90° C for 8 hours. At the end of this time the reaction is terminated by cooling and venting the reactor. The crude liquid product (108 ml) is filtered to remove solid palladium catalyst, evaporated under vacuum to remove 1-octene and ethanol, and the residual liquid subjected to further distillation. Ethyl nonanoate is recovered in up to 83 mole % yield (99% purity) as a distillate fraction having a boiling point of 58°-62° C at 2 mm Hg pressure.

The recovered residual palladium catalyst $[(C_2H_5)_4N](SnCl_3)-PdCl_2[P(C_6H_5)_3]_2$ from the above experiment is charged to a second degassed sample of 1-octene (0.5 mole) and ethanol (0.5 mole), and the mixture carbonylated as described supra. The ethyl nonanoate ester is recovered by distillation as above, the solid palladium catalyst is then recycled with three additional batches of fresh 1-octene, ethanol mixture. A summary of the octene conversion, and ethyl nonanoate selectivity and yield data for these five catalyst cycles is given in Table II. Gas chromatographic analyses were used to determine the conversion and selectivity data.

After five cycles the spent palladium catalyst is refluxed with an aqueous (30% v/v) solution of hydrogen peroxide (30 ml) at 70°-80° C for about 2 hours, excess solvent stripped off under vacuum (5 cm Hg), and the residual solid recycled to the carbonylation reactor with fresh 1-octene, ethanol mixture, but without adding more stabilizing ligand, triphenylphosphine. As can be seen from Table II, the $H_2O_2$ process without $PPh_3$ addition is unsuccessful in regenerating spent palladium carbonylation catalysts such as $[(C_2H_5)_4][SnCl_3]-PdCl_2[P(C_6H_5)_3]_2$.

EXAMPLES 10-15
PALLADIUM CATALYST REGENERATION EFFECT OF CHANGES IN REACTANTS

In these examples, the carbonylation of samples of equimolar α-olefin-alkanol mixtures are carried out in accordance with the procedures outlined in Example 1, using the same dispersion of palladium complex in quaternary salt, viz.

$10[(C_2H_5)_4N][SnCl_3]-PdCl_2[P(C_6H_5)_3]_2$

The following olefin-alkanol mixtures gave good yields of the corresponding esters over 8 catalyst cycles:
Propylene — 1-decanol
1-Hexene — iso-propanol
1-Decene — 2-chloroethanol
1-Tetradecene — methanol
1-Octene — 2-ethylhexanol
Propylene — phenol As the previous data and comments have indicated, the procedures for catalyst regeneration of this invention are both novel and useful. They may be applied to catalysts consisting of dispersions of ligand-stabilized palladium(II) halide salts in quaternary ammonium, phosphonium and arsonium salts of trihalostannate(II)

TABLE II

PREPARATION OF ETHYL NONANOATE WITH RECOVERY OF ESTER BY DISTILLATION AND REGENERATION OF PALLADIUM CATALYST BY REFLUXING WITH HYDROGEN PEROXIDE REAGENT

| CYCLE | PROCEDURE | ETHYL C_9 ESTER LINEARITY(%)[a] | YIELD(MOLE %)[b] | LIQUID YIELD | ISOLATED ESTER PURITY(%)[a] |
|---|---|---|---|---|---|
| I | Fresh Catalyst | 73.6 | 97 | 94 | 99 |
| II | Recycle | 88.3 | 69 | 100 | 99 |
| III | Recycle | 90.5 | 22 | 100 | 99 |
| IV | Recycle | 91.4 | 13 | 100 | 99 |
| V | Recycle | 91.8 | 9.5 | 100 | 98 |
| VI | Reflux with $H_2O_2$ | 91.3 | 1 | 100 | 98 |
| VII | Recycle | 91.6 | 1.0 | 100 | 86 |

[a]Estimated by GLPC analysis of distilled product
[b]Estimated by GLPC analysis of crude liquid product, based on 1-octene charged.

EXAMPLES 3-9
PALLADIUM CATALYST REGENERATION EFFECT OF CATALYST COMPOSITION

In these examples the carbonylation of 1-octene, ethanol samples and regeneration of palladium catalyst are carried out in accordance with the procedure outlined in Example 1, but in the presence of various other ligand-stabilized palladium(II) halide complexes dispersed in quaternary ammonium phosphonium and arsonium salts of trihalostannate(II) and trihalogermanate(II). The following catalyst compositions showed satisfactory performance for ethyl nonanoate synthesis over 8 cycles:
$10[(C_2H_5)_4N][SnCl_3]-PdCl_2[P(p-CH_3.C_6H_4)_3]_2$
$5[ClCH_2(C_6H_5)_3P][SnCl_3]-PdCl_2[P(C_6H_5)_3]_2$
$10[(n-C_4H_9)_4N][SnCl_3]-PdCl_2[P(C_6H_5)_3]_2$
$10[(C_6H_5)_4As][SnCl_3]-PdCl_2[P(C_6H_5)_3]_2$
$5[(C_2H_5)_4N][GeCl_3]-PdCl_2[P(C_6H_5)_3]_2$
$10[(C_2H_5)_4N][SnCl_3]-PdCl_2[P(p-CH_3O.C_6H_4)_3]_2$
$5[(C_7H_{15})_4N][GeCl_3]-PdCl_2[As(C_6H_5)_3]_2$ and trihalogermanate(II) useful in the catalytic carbonylation of olefins.

Further, the invention processes are flexible in permitting changes and modifications to be made without departing from the inventive process.

However, the metes and bounds of this invention can best be gleaned by reading the claims that follow in conjunction with the rest of the specification.

What is claimed is:

1. A process for regenerating spent palladium carbonylation catalysts consisting of dispersions of ligand-stabilized palladium(II) halide catalyst complexes in quaternary ammonium, phosphonium, and arsonium salts of trihalostannate(II) and trihalogermanate(II), the spent catalyst being obtained from the carbonylation of olefins, said ligand-stabilixed catalysts being selected from the group consisting of:
$[(C_2H_5)_4N][SnCl_3]-PdCl_2[P(C_6H_5)_3]_2$
$[(C_2H_5)_4N][SnCl_3]-PdCl_2[P(p-CH_3.C_6H_4)_3]_2$
$[ClCH_2(_6H_5)_3P][SnCl_3]-PdCl_2[P(C_6H_5)_3]_2$
$[(n-C_4H_9)_4N][SnCl_3]-PdCl_2[P(C_6H_5)_3]_2$
$(C_6H_5)_4As][SnCl_3]-PdCl_2[P(C_6H_5)_3]_2$
$[(C_2H_5)_4N][GeCl_3]-PdCl_2[P(C_6H_5)_3]_2$
$[(C_2H_5)_4N][SnCl_3]-PdCl_2[P(p-CH_3O.C_6H_4)_3]_2$, and
$[(C_7H_{15})_4N][GeCl_3]-PdCl_2[As(C_6H_5)_3]_2$,
by the steps of:

a. Contacting said spent catalyst with an aqueous solution of hydrogen peroxide at 20° to 150° C in the mole ratio of 1-10$^4$ mole of peroxide per gram atom of palladium present in said catalyst.

b. Adding additional stabilizing ligand to the solid catalyst in the mole ratio of 1-10 mole of ligand per gram atom of palladium present, said stabilizing ligand being selected from the group consisting of triphenylphosphine, triphenylarsine, tri-p-tolylphosphine and tri-p-methoxyphenylphosphine, until the spent palladium carbonylation catalyst is regenerated.

2. The process of claim 1 wherein the added hydrogen peroxide reagent is dissolved in an aqueous media in 1 to 90% concentration by volume.

3. The process of claim 1 wherein the amount of aqueous solution of hydrogen peroxide is reduced by distillation prior to the addition of stabilizing ligand.

* * * * *